United States Patent [19]

Ransom et al.

[11] Patent Number: 4,678,007
[45] Date of Patent: Jul. 7, 1987

[54] PRESSURE OPERATED VALVE

[75] Inventors: Keith C. Ransom, Benfleet; Henry G. Howitt, Malmesbury, both of United Kingdom

[73] Assignee: Ford Motor Company, Dearborn, Mich.; Mycalex (Motors) Ltd., Gloucestershire, England

[21] Appl. No.: 805,493

[22] Filed: Dec. 5, 1985

[30] Foreign Application Priority Data

Dec. 5, 1984 [GB] United Kingdom ................ 8430681

[51] Int. Cl.$^4$ .......................................... F16K 31/126
[52] U.S. Cl. ........................... 137/625.66; 137/625.27; 251/75
[58] Field of Search ........... 137/625.27, 625.5, 625.66; 251/75

[56] References Cited

U.S. PATENT DOCUMENTS

| | | |
|---|---|---|
| 1,719,687 | 7/1929 | Browne .................................. 251/75 |
| 2,652,857 | 9/1953 | Engstrum ............................. 251/75 |
| 3,430,437 | 3/1969 | Saussele ..................... 137/625.27 X |
| 3,719,320 | 3/1973 | Morris et al. . |
| 3,749,354 | 7/1973 | Raitport . |
| 3,794,075 | 2/1974 | Stoll ............................... 137/625.66 |

FOREIGN PATENT DOCUMENTS

| | | |
|---|---|---|
| 1064000 | 8/1959 | Fed. Rep. of Germany ... 137/625.5 |
| 983722 | 2/1965 | Fed. Rep. of Germany . |
| 1016179 | 1/1966 | Fed. Rep. of Germany . |
| 1085357 | 9/1967 | Fed. Rep. of Germany . |
| 1276704 | 6/1972 | Fed. Rep. of Germany . |
| 2329068 | 1/1975 | Fed. Rep. of Germany ........ 251/75 |
| 1028530 | 5/1953 | France .................................. 251/75 |

Primary Examiner—Robert G. Nilson
Attorney, Agent, or Firm—Robert E. McCollum; Clifford L. Sadler

[57] ABSTRACT

A pressure operated valve is arranged so that it switches over rapidly between two opposite end positions. The valve has a pressure chamber closed by a diaphragm. Between the diaphragm and the valve member, there is a snap-action spring which continues to hold the valve member in one end position during a first phase of diaphragm movement, and at a preset point snaps over to a condition where it accelerates the valve member into its opposite end position, and holds it there. A biasing spring may oppose the force exerted on the diaphragm by pressure (normally vacuum) in the pressure chamber. The valve has use in EGR systems, as well as engine decelerating systems.

8 Claims, 9 Drawing Figures

PRESSURE OPERATED VALVE

This invention relates to a pressure operated valve. The valve is particularly suitable for operation by vacuum and may, for example, be used in an exhaust gas recirculation (EGR) system or in a deceleration valve system.

A requirement in such valves is that they should be quick acting, i.e., there must be a rapid switch-over between two end positions. The prior art valves known use a diaphragm which is influenced by a pressure differential between its two sides to move and close an electrical contact to energize a solenoid which produces a magnetic field. The magnetic field then moves the valve member. The mechanical/electrical interface in such valves is liable to failure, and a large number of components are required.

According to the present invention, there is provided a pressure operated valve comprising a pressure chamber closed by a diaphragm and a valve operating member connected to the side of the diaphragm outside the pressure chamber by means of an over-center type snap-action spring which snaps over during diaphragm movement to rapidly move the valve member from one end position to an opposite end position.

The pressure chamber preferably includes biasing means for urging the diaphragm in a direction opposite to that in which it will move under the influence of pressure in the chamber.

Preferably the valve is constructed so that it is operated by negative pressure, i.e., vacuum, in the chamber, and the biasing means is a compression spring which biases the diaphragm in the direction of increasing volume of the chamber.

The valve member preferably controls fluid flow between three ports, and the valve member has two positions.

One of the three ports may be a vent port which connects the side of the diaphragm outside the pressure chamber to atmospheric pressure. Alternatively, there may be a separate vent port for venting said side of the diaphragm, and each of the ports enters into an enclosed chamber in the valve.

When used in an exhaust gas recirculation system in a motor vehicle, engine manifold vacuum can be used to operate the valve.

When used in a deceleration valve system, spark port vacuum can be used to operate the valve.

The valve preferably includes end stops for limiting diaphragm movement. There may be provision for adjusting the biasing force applied by the biasing means to the diaphragm in order to set the valve to switch over at the desired vacuum level.

The valve may include an auxiliary pressure chamber associated with the main pressure chamber. In this embodiment, the main pressure chamber will be fed with control pressure through the auxiliary chamber, and a passage between the main and auxiliary chambers will be either opened or closed according to the pressure in the auxiliary chamber. In this way, vacuum can be trapped in the main chamber even if the control pressure should drop below the level necessary to hold the valve in one end position.

The auxiliary chamber may be fed with control pressure from more than one source. For example, when the valve is used as a part of a deceleration valve system, the auxiliary chamber may be fed with pressure (vacuum) from the spark port and from the venturi port of a carburetor.

The auxiliary chamber may include a spring biased diaphragm which is adapted to open and close the passage between the pressure chambers. The passage may have a main channel (to be opened and closed on movement of the diaphragm) and subsidiary channels which allow air flow only in a direction out of the main chamber.

The invention will now be further described, by way of example, with reference to the accompanying drawings, in which.

Figure 1:
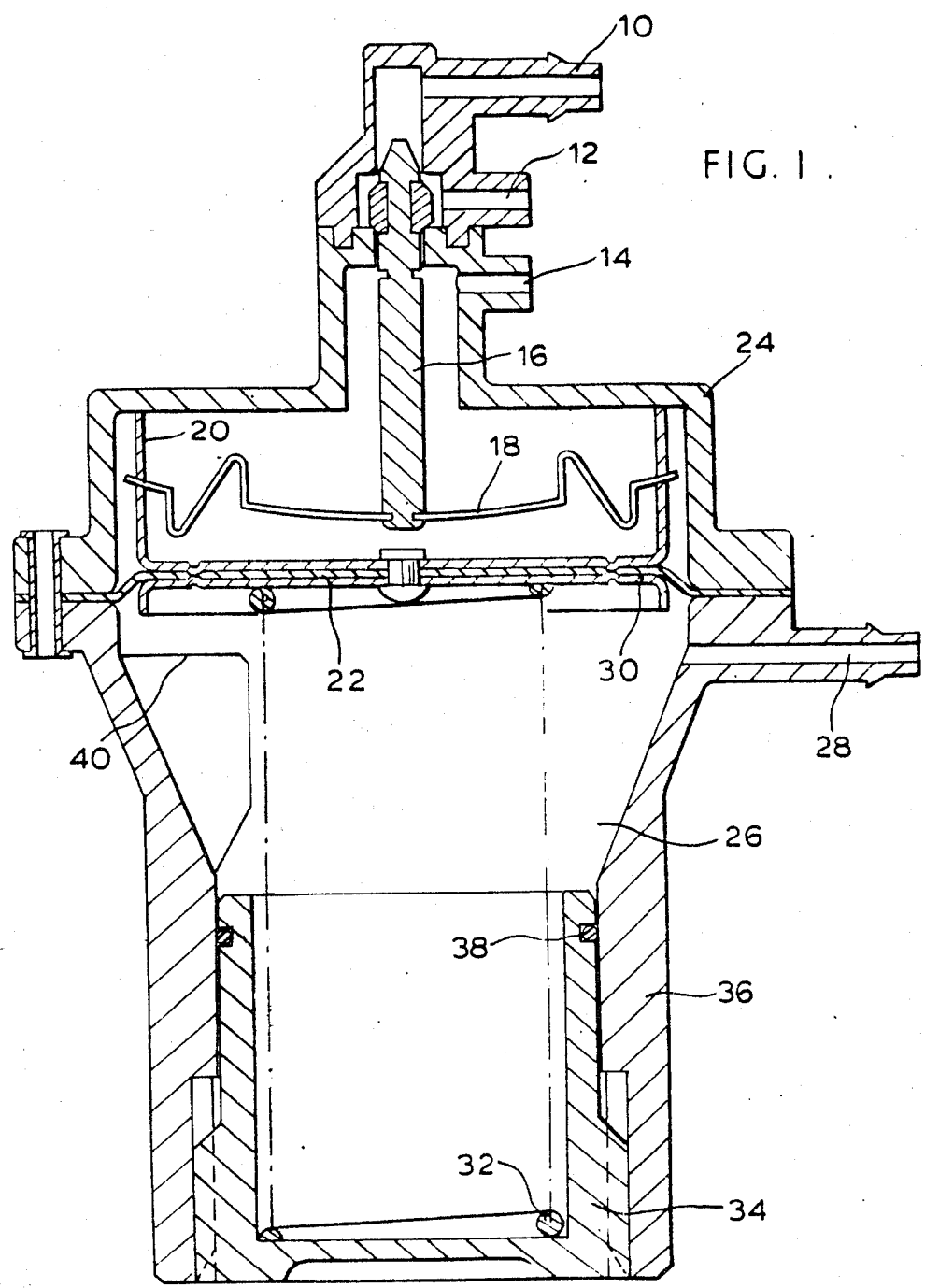
FIG. 1 is a cross-sectional view of a pressure operated valve in accordance with the invention.

The function of the valve shown is to control flow between three fluid flow ports 10, 12, 14. Flow is controlled by an axially movable valve member 16. In the position shown in FIGS. 1 and 2A, the valve member 16 is in its lower end position where it permits flow between ports 10 and 12. In its opposite, upper end position, shown in FIG. 2B, flow is permitted between ports 12 and 14.

The lower end of the valve member 16 is connected to a plate spring 18, the periphery of which is connected to an inverted disc-shaped member riveted to a diaphragm 22. The dish member 20 has an upstanding peripheral portion on which the edges of spring 18 are supported, and its upper edge provides an upper stop abutment for the diaphragm movement against a surface of an upper part 24 of the valve casing or housing.

A pressure chamber 26 is formed below the diaphragm, and has a port 28 for connection to a pressure source, usually vacuum. When vacuum is admitted to chamber 26, it causes diaphragm 22 to be drawn downwards to operate the valve 16 in a way to be described.

Within chamber 26 is a helical compression spring 32 that acts on the diaphragm 22 through a spring retainer plate 30. In the absence of vacuum in the chamber 26, spring 32 biases the diaphragm upwards to the position shown in FIGS. 1 and 2a, where the upper periphery of the disc-shaped member 20 is in contact with the housing portion 24.

The lower end of spring 22 is received in an inverted cup-shaped member 34 which is screwed into the open end of a lower portion of the housing 36 to form the pressure chamber.

The upward biasing force exerted by the spring 32 will determine the switch-over point of the valve. To set the valve so that it switches over at the desired pressure in the chamber 26, the cup member 34 can be adjusted by screwing it into or out of the housing 36 to alter the force exerted by the spring 22. Once the correct setting has been reached, the cup member 34 can be permanently connected to the housing 36, for example, by deforming one or the other of these components so that they cannot thereafter move relative to one another.

An O-ring seal 38 seals the cup member 34 to the housing 36.

A lower stop for the movement of the diaphragm 32 is provided in the form of a shoulder 40 within the chamber 26. The lower edge of the plate 30 abuts this shoulder in the end position.

Figure 5:
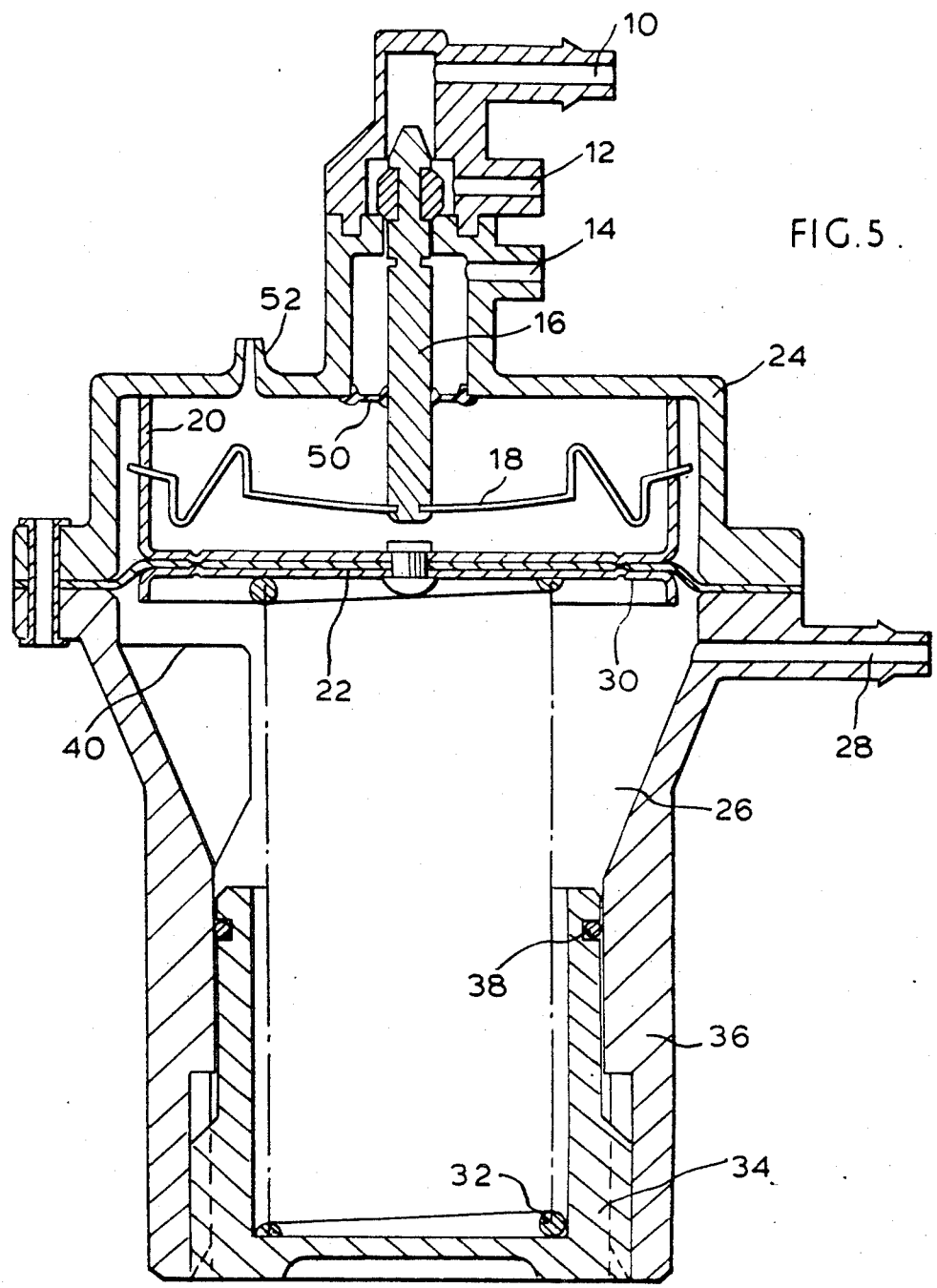
FIG. 5 is a view corresponding to FIG. 1 showing a second embodiment of a valve in accordance with the invention.

The valve shown in FIG. 5 is the same in all respects as the valve of FIG. 1, except for the addition of a seal 50 between the lower port 14 and the diaphragm 22, and the addition of a vent port 52. The latter ensures proper diaphragm operation by venting of the chamber above the diaphragm 22.

Figure 6:
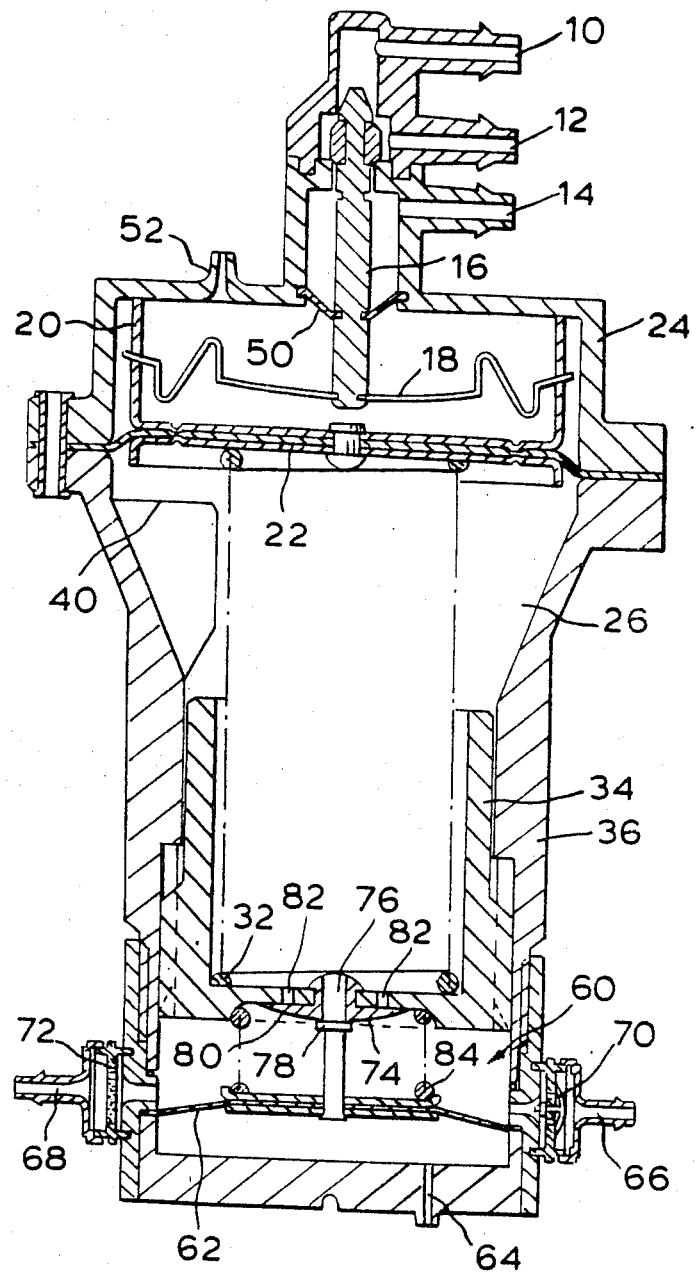
FIG. 6 is a view corresponding to FIG. 1 showing a third embodiment of a valve in accordance with the invention.

A modified valve is shown in FIG. 6. In this figure, parts corresponding to those already described with reference to earlier figures bear the same reference numerals.

The housing portion 36 in FIG. 6 is extended downwards to provide an auxiliary chamber 60. The chamber 60 is divided into two subchambers by a diaphragm 62, the underside of which is vented to atmosphere through a vent 64. The upper subchamber is fed by a first control port 66 and by a second control port 68. When the valve is used in a deceleration valve system, the port 66 is connected to carburetor spark port vacuum and the port 68 is connected to carburetor venturi vacuum. A one-way umbrella type valve 70 is provided in the port 66 and a time delay type sintered disc 72 is provided in the port 68.

In the base of the cup-shaped member 34, an umbrella type seal 74 is fitted in a central hole. The seal 74 itself has a hole 76 extending through it. This hole 76 can be closed by a plug 78 mounted on the diaphragm 62, when the diaphragm is in a raised position as shown in FIG. 6.

The seal 74 also has a radial skirt 80 which covers additional passages 82 through the base of the cup-shaped member 34.

When the pressure in the main chamber 26 is higher than that in the auxiliary chamber 60, the skirt 80 will be lifted away from the passages 82 by the pressure so that air can flow from the main chamber to the auxiliary chamber.

A helical spring 84 acts between the base of the cup-shaped member 34 and a rigid disc-shaped spring retainer at the center of the diaphragm 62, and biases the diaphragm downwardly.

The presence of the auxiliary chamber 60 and the two control ports 66 and 68 allows the valve to be responsive to vacuum at either one of the two ports, whichever vacuum is the greater. The sintered disc 72 and the one-way valve 70 prevent the vacuum in the chamber from decaying sharply.

Figure 2A:
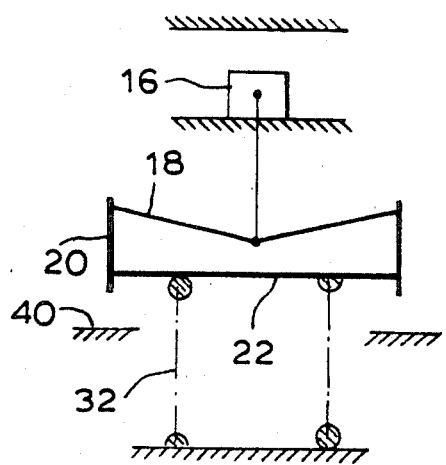
FIGS. 2A, 2B, 2C and 2D show schematically four stages in the operation of the valve.
Figure 2B:
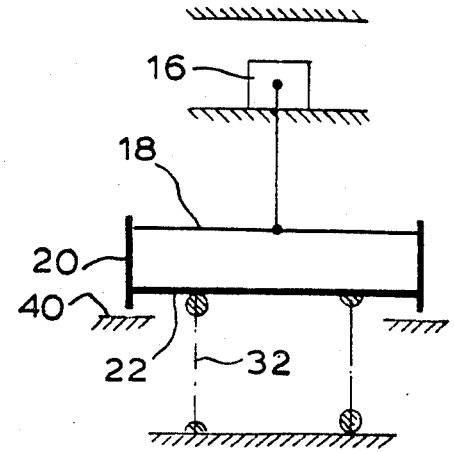
Figure 2C:
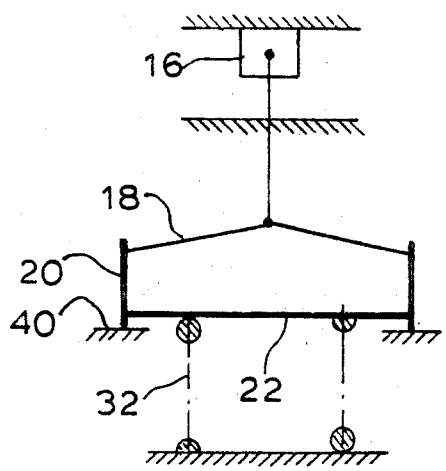
Figure 2D:
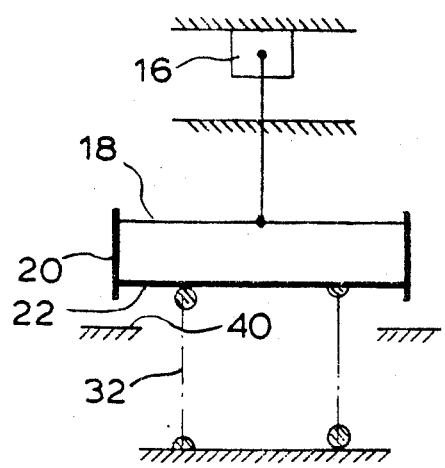
Figure 3:
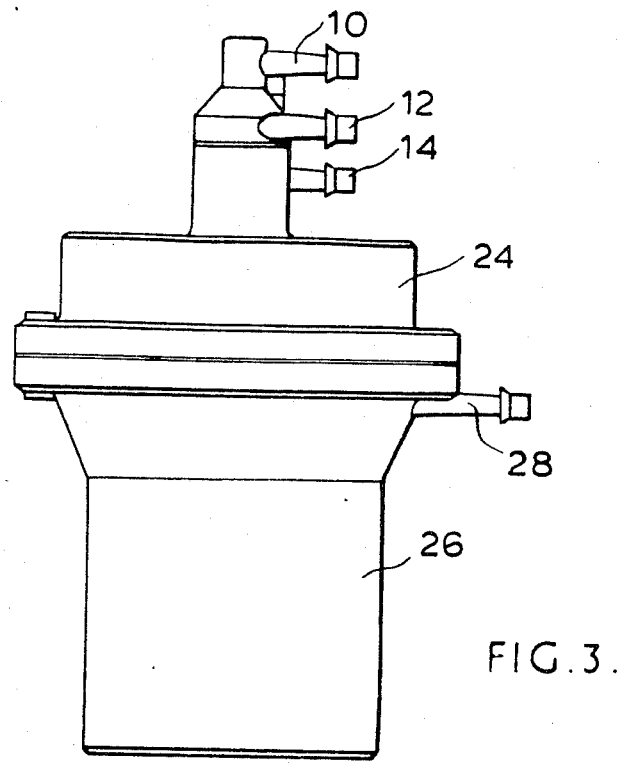
FIG. 3 is a side elevational view of the valve shown in FIG. 1.
Figure 4:
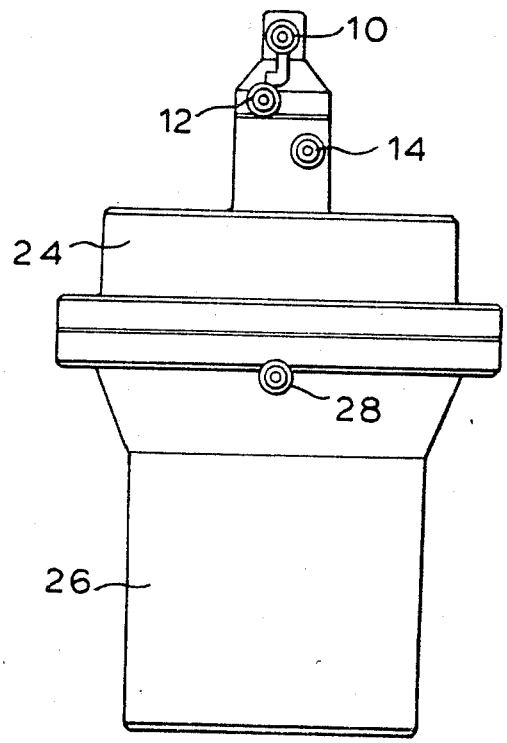
FIG. 4 is a front elevational view of the valve.

In FIGS. 2A and 2D, the various components of the valve are shown schematically. FIG. 2A corresponds to the position shown in FIG. 1. The spring 18 is bowed downwardly and pulls the valve member 16 down to its lower end position. In FIG. 2B, the diaphragm 22 has been pulled down by vacuum in port 28 acting in the pressure chamber 26. The spring 18 has reached a position where it is on center or flat. Any further downward movement of the diaphragm will snap the spring over center to the opposite side of this flat position, thus accelerating the valve member 16 rapidly into its uppermost position, as seen in FIG. 2C. This same position of the spring is maintained until the diaphragm reaches its lower stop, as also seen in FIG. 2C. On return movement of the diaphragm, as seen in FIG. 2D, when the vacuum in chamber 26 weakens, the reverse will happen. The valve member 16 will be held in its upper end position until the upward movement of diaphragm 22 flattens spring 18. Continued upper movement of the diaphragm then will snap the spring over center, and as soon as the spring mvoes slightly beyond its flat state, rapidly accelerate the valve back to its lower end position.

Note that the stem of the valve member 16 which is connected to the spring 18 is rigid. During the movement from the position 2A to the position 2B, this stem is in tension. Between FIGS. 2C and 2D, the stem is in compression, and the stem must be capable of remaining rigid under both these conditions,. Furthermore, the engagement between the valve member 16 and its valve seat must be capable of resisting these tension and compression forces.

In an emission control application in a motor vehicle exhaust gas recirculation (EGR) system, a valve as described enables a two-stage EGR valve to be replaced by a single stage EGR valve. At high levels of depression (vacuum), this valve operates and can feed atmospheric pressure to the EGR valve causing it to close the exhaust gas flow port. Normally several components would be required to carry out this function; this valve will economically replace them. In such an application, the port 10 would be vented, the port 12 would be connected to the EGR valve, the port 14 would be connected to control vacuum, and the port 28 would be connected to either manifold or spark port vacuum.

As an example, the following figures can be given for a design in which the valve must actuate at 330.2 mm/Hg.

Position 2A—Forces from the spring 32 and the spring 18 act upwards, and vacuum acts downwards on the diaphragm. The diaphragm remains in contract with the upper stop until a vacuum of 315.2 mm/Hg is reached.

Position 2B—The forces act in the same direction as in Position 2A. At the moment when the valve actuating spring is straight, a vacuum of 330.2 mm/Hg is applied.

Position 2C. The spring 32 acts upwards; vacuum and the force of the spring 18 act downwards on the diaphragm. The diaphragm remains in contact with the lower stop as long as vacuum is greater than 330.5 mm/Hg.

Position 2D. The forces act in the same direction as in position 2C. The valve actuating spring 18 is straight and a vacuum of 309.6 mm/Hg is applied.

This proposed design gives a variation of 20.6 mm/Hg between the two controlled valve actuating vacuums; this is the hysteresis of the valve and amounts to 6.2%.

The completed valve can be tested and set by a microcomputer. The general procedure will be as follows:

With the spring 32 set to an initial position that ensures the controlled valve is in the position shown in FIG. 1, the microcomputer then applies a vacuum to the port 28 and detects the vacuum level at which the valve operates. This vacuum then tells the computer the further adjustment required on the spring 32, it corrects the coil spring adjustment via the threaded cup member 34 and repeats the test. Once set correctly, the computer tests the return controlled valve actuating vacuum to establish that the hysteresis is within the required limits. With all these stages complete, the thread of the adjustable cup member 34 is locked to the lower portion of housing 36 to prevent any unauthorized adjustment. Suitably, a hot iron can be used to effect this locking procedure.

When port 14 in FIG. 6 is connected to another device, and a vacuum supplied to that device when the valve member 16 is in its upper position shown in FIGS. 2C and 2D, on movement of the valve member to its lower position as shown in FIGS. 2A and 2B, the vacuum supplied through the port 14 would be trapped. This can be useful when the valve is used to operte a deceleration valve or any other high vacuum operating device.

There also may be occasions when the operation of the valve in FIG. 6 should be inhibited. This can be achieved in a number of ways, e.g., (1) allowing the vacuum in the lower chamber 26 to be vented by a solenoid installed inside the spring 32, (2) by applying vacuum to the upper chamber, or (3) by applying pressure to the lower chamber 26.

Vacuum also could be applied to the upper chamber through the vent port 52.

While the invention has been shown and described in its preferred embodiments, it will be clear to those skilled in the arts to which it pertains that many changes and modifications may be made thereto without departing from the scope of the invention.

I claim:

1. A two position, three port control valve assembly, comprising, a valve housing having a central port and an end port axially spaced therefrom on each side of the central port, a valve reciprocably mounted in the housing movable between two end positions alternately connecting the central port to one or the other of the end ports, an annular flexible diaphragm movable independent of the valve and dividing the housing into a valve chamber side and a pressure chamber side, a control pressure port opening into the housing and operatively connected to the pressure chamber and connected to a source of pressure for moving the diaphragm, and overcenter snap action type spring means operatively connecting the diaphragm to the valve for a limited movement therebetween for control movement of the valve between its end positions upon actuation of the diaphragm and for providing a snap action overcenter movement of the valve during diaphragm movement to rapidly move the valve between its end positions, the connecting means including a spacer axially spacing the spring means from the diaphragm which interconnects the two, the spacer being a cup-shaped element with a base and an upstanding annular wall portion, and the spring means being of the plate type edge mounted to the wall portion.

2. A two position, three port control valve assembly, comprising a valve housing having a central port and an end port axially spaced therefrom on each side of the central port, a valve reciprocably mounted in the housing movable between two end positions alternately connecting the central port to one or the other of the end ports, an annular flexible diaphragm movable independent of the valve and dividing the housing into a valve chamber side and a pressure chamber side, a control pressure port opening into the housing and operatively connected to the pressure chamber and connected to a source of pressure for moving the diaphragm, and overcenter snap action type spring means operatively connecting the diaphragm to the valve for a limited movement therebetween for control movement of the valve between its end positions upon actuation of the diaphragm and for providing a snap action overcenter movement of the valve during diaphragm movement to rapidly move the valve between its end positions, including other spring means biasing the diaphragm towards the valve, the pressure moving the diaphragm in the opposite direction, a second diaphragm subdividing the pressure chamber into a second pressure chamber side and an atmospheric pressure chamber side vented to atmosphere, a one-way check valve normally blocking communication between the first mentioned pressure chamber and the second chamber so long as the first mentioned chamber pressure is lower than that of the second chamber, and means connecting the second chamber to a source of pressure selectively varying from an atmospheric level to a subatmospheric level to control the opening of the check valve and movement of the first mentioned diaphragm to move the valve.

3. An assembly as in claim 2, including a second pressure port connected at one end to the second chamber and at its other end to a pressure source varying in level from atmospheric to subatmospheric, a time delay valve in said second port, the lower pressure level between the two pressure ports controlling the opening of the first mentioned check valve and movement of the first mentioned diaphragm and valve.

4. An assembly as in claim 2, including housing means between the first mentioned pressure chamber and second chamber for blocking flow between the two, the housing means having apertures therethrough, the check valve being of the flexible umbrella type covering the holes so long as the pressure in the first chamber is less than that in the second chamber.

5. An assembly as in claim 4, the umbrella valve having a central hole larger than the apertures, and valve means connected to the second diaphragm movable therewith to cover and uncover the central hole to control the quickness of communication between the first and second chambers.

6. An assembly as in claim 1, including seal means between the valve and the housing dividing the latter into a further pressure chamber and the valve side chamber, the further chamber communicating with one of the end ports whereby blockage of the end port seals the further chamber, the valve side chamber containing an atmospheric vent through the housing to eliminate trapping of pressure therein.

7. An assembly as in claim 1, wherein the snap action spring is a plate spring.

8. An assembly as in claim 1, including means for adjusting the force of the biasing means.

* * * * *